United States Patent

Niskanen

[11] 4,050,355
[45] Sept. 27, 1977

[54] INDEXING DEVICE

[75] Inventor: Karl G. Niskanen, Latrobe, Pa.

[73] Assignee: Kennametal Inc., Latrobe, Pa.

[21] Appl. No.: 714,606

[22] Filed: Aug. 16, 1976

[51] Int. Cl.² .................. B23F 23/08; B23Q 17/00
[52] U.S. Cl. ............................... 90/56 R; 74/817;
90/58 B; 408/71
[58] Field of Search ................... 90/58 B, 56 R;
74/813 L, 817, 822, 827; 408/45, 71; 269/63

[56] References Cited

U.S. PATENT DOCUMENTS

| 3,170,333 | 2/1965 | Umbricht | 74/827 X |
|---|---|---|---|
| 3,580,111 | 5/1971 | Tyrner | 74/817 |
| 3,633,442 | 1/1972 | Stoen | 74/827 X |

Primary Examiner—Othell M. Simpson
Assistant Examiner—Z. R. Bilinsky
Attorney, Agent, or Firm—Melvin A. Crosby

[57] ABSTRACT

An indexing device for indexing a member, such as a table, into operative working positions in which the table carries follower elements, such as rollers, and cooperating therewith is a drive member mounted on a pair of parallel equal length arms which rotate in unison thereby causing the drive member to take an orbital path. The drive member is slotted and during travel along the orbital path picks up one of the followers on the table and therethrough causes the table to carry out an indexing movement. The indexing movement of the table is smooth and does not involve movement of the table at excessive speeds.

5 Claims, 4 Drawing Figures

INDEXING DEVICE

The present invention relates to an indexing device and is particularly concerned with an indexing device for indexing a work table or like work member into a plurality of predetermined indexed operative positions.

Indexing devices of various types are known for indexing work tables and the like but, heretofore, have involved certain drawbacks, either in the form of excessive expense or unreliable operation or have been operable to drive the indexed member at higher than desirable speeds during a part of the indexing operation.

With the foregoing in mind, a primary objective of the present invention is the provision of a indexing mechanism for indexing a work table or the like which avoids the drawbacks specifically referred to above.

BRIEF SUMMARY OF THE INVENTION

According to the present invention, a table or like rotary work member is provided with followers uniformly spaced about a circle having the center at the center of rotation of the table. For indexing the table from one position to the next, a drive member in the form of a block is provided having a slot for receiving a said follower with arms being connected to the drive member for causing it to follow an orbital path in a plane perpendicular to the axis of rotation of the table.

In operation, the block engages a follower, and during movement of the block in its orbital path, the follower and the table connected thereto is carried along with the drive member thereby advancing the table to the next indexed position. The drive block releases the follower when the table reaches the new position and, simultaneously, a shot bolt can drop into a hole in the periphery of the table, thereby fixedly to hold the table in the new indexed position.

The mechanism driving the orbital block, which can consist of motor driven worm and worm wheels connected to each of the drive member support arms is halted in an idle position during a work operation and is, again, placed in motion when it is desired to index the table to its next position. The shot bolt is, of course, withdrawn from the table at least during the initial part of the indexing movement thereof.

The exact nature of the present invention will become more clearly apparent upon reference to the following detailed specification taken in connection with the accompanying drawings in which.

DETAILED DESCRIPTION OF THE INVENTION

Figure 1:
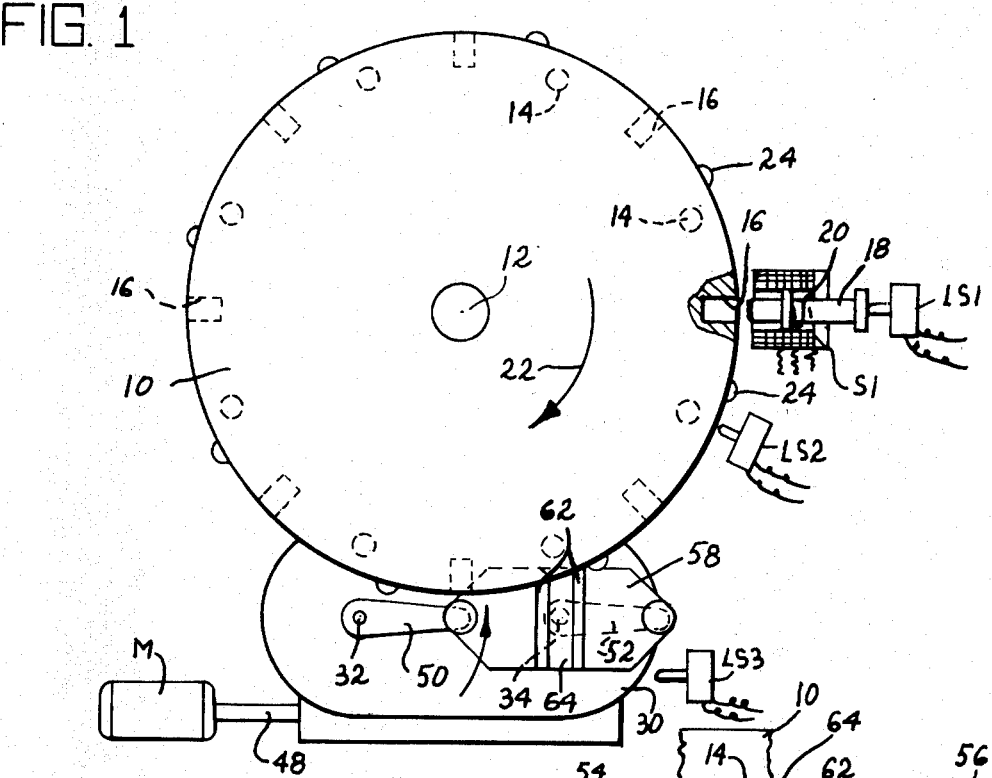
FIG. 1 is a somewhat schematic plan view showing a table of an indexing mechanism according to the present invention associated therewith.

Referring to the drawings somewhat more in detail, in FIG. 1, reference numeral 10 indicates a table rotatable about a central axis 12. The table may be provided with work holding fixtures and the like and is adapted for being indexed into a plurality of positions in which work operations can be performed on work members mounted in the not shown fixtures that are attached to the table.

According to the present invention, the underside of the table is provided with followers 14, which may be in the form of rollers, and which are uniformly circumferentially spaced about the axis 12 and are all the same distance from the axis. As illustrated, the followers or rollers 14 are eight in number, but other numbers of rollers can be employed.

About the periphery of the table are a plurality of holes 16, each adapted for receiving a shot bolt 18 which is spring biased toward table engaging position by a spring 20 and is adapted for being withdrawn from table engaging position by energization of a solenoid S1. When the shot bolt is withdrawn from table engaging position, it is adapted for engaging and closing a limit switch LS1, normally open.

As illustrated, the table is adapted to be indexed in the direction of arrow 22 thereon. The table is provided with cam elements 24 thereon, a respective one of which is adapted for engaging and opening a normally closed limit switch LS2 when the table indexes a predetermined distance away from one indexed position toward the next.

Figure 2:
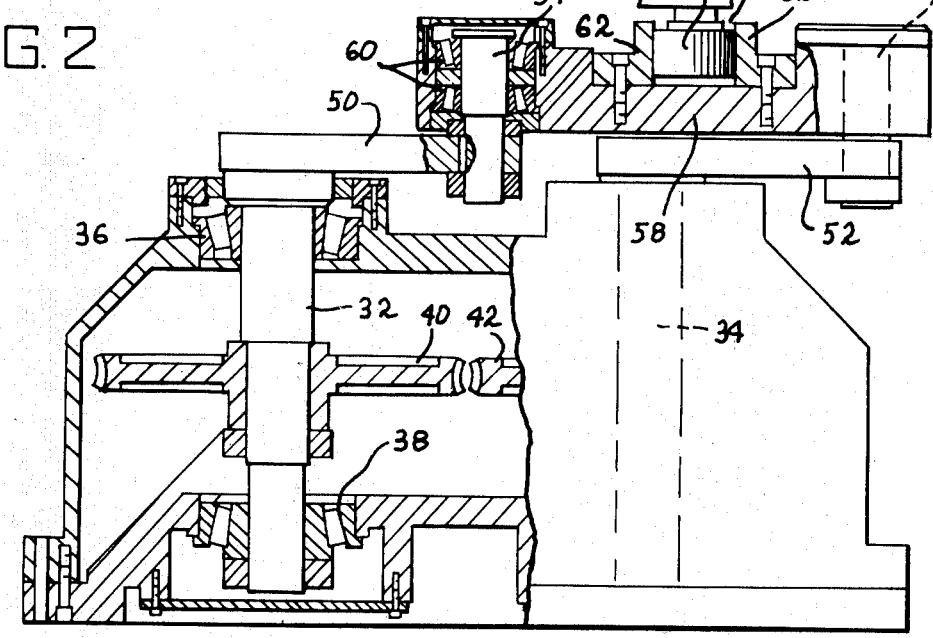
FIG. 2 is a vertical sectional view indicated by line II—II on FIG. 1.
Figure 3:
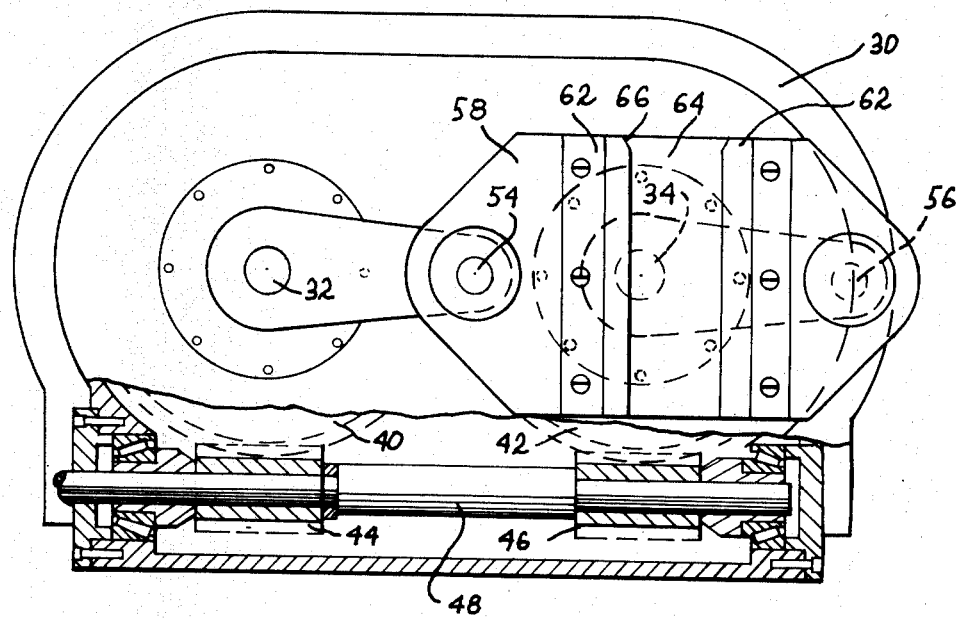
FIG. 3 is a partial plan sectional view as indicated by line III—III on FIG. 2.

The indexing mechanism, which will best be seen in FIGS. 2 and 3, and is schematic plan view in FIG. 1, consists of a frame 30 having rotatable on vertical axes therein a pair of spaced vertical shafts 32 and 34. The shafts are supported in suitable antifriction bearings 36 in the upper part of frame 30 and 38 in the lower part of frame 30. The shafts carry respective worm wheels 40 and 42 which are engaged by respective worms 44 and 46 with the worms being keyed to a shaft 48 which is connected to be driven in one direction of rotation by a motor M.

Extending from the upper ends of shafts 32 and 34 in horizontal parallel relation are respective drive arms 50, 52. At the outer ends of the arms, and at equal distances from the axes of rotation of the respective shafts 32, 34, the arms carry the vertically extending drive pins 54, 56. The drive pins are connected to a blocklike drive member 58 by antifriction bearings, as indicated at 60. Drive member 58 is disposed in a horizontal plane parallel to the plane of the table 10 and is movable in an orbital path in the respective plane as arms 50, 52 rotate.

The drive member 58 is provided with a pair of spaced rails 62 defining therebetween a space of a size to closely receive a follower or roller 14. Advantageously, the slot defined between bars 62, and which is indicated by reference numeral 64, has a tapering entrance throat at 66 to compensate for any slight misalignment of the slot with the followers as the slot approaches a follower for engagement therewith.

In operation, assuming that the shot bolt 18 is in engagement with a bore provided therefor in the periphery of table 10, to hold a table 10 in a predetermined indexed position, one or more work operations can be carried out on work members carried in fixtures that are mounted on the top of the table. The working tools which operate the work members would, of course, be stationarily mounted, and the indexing table would bring workpieces to the work stations and then carry the workpieces away from the respective work stations.

Figure 4:
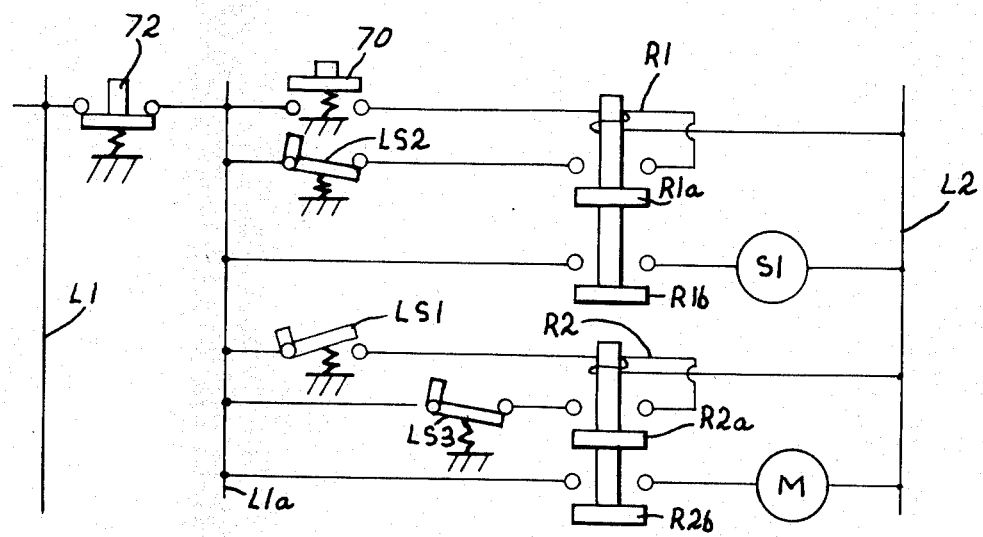
FIG. 4 is a schematic electric control circuit for controlling the indexing mechanism.

If, now, an indexing operation is to be carried out, the operator will depress a normally open pushbotton 70, as shown in FIG. 4, when switch 70 is closed, a relay R1 is energized and is maintained energized via a holding circuit provided by its blade R1 and the normally closed limit switch LS2. The relay has a second blade R1b which, when closed, energizes solenoid S1, thereby to withdraw shot slot 18 from the periphery of table 10.

When shot bolt 18 is disengaged from table 10, it is moved outwardly far enough to engage and close limit switch LS1, and when this is accomplished, the coil of relay R1 is energized. Relay R2 has a holding circuit, including its blade R2a, and normally closed limit switch LS3. The relay also has a blade R2b which, when closed, energizes the motor M which causes drive member 52 to take an orbital path.

Normally closed limit switch LS3, as will be seen in FIG. 1, is positioned to be engaged and opened by drive member 58, or a cam thereon, in the idle portion of its travel and which is any place between the time it releases one follower or roller 14 and up to the time it engages the next one of the followers or rollers 14.

During an indexing cycle, after drive member 58 has left the follower 14 with which it was engaged, it will engage and open limit switch LS3 and thereby deenergize motor M. When, now, relay R2 is again closed, motor M will commence to run and drive member 58 will move away from limit switch LS3 and permit it to close and establish the holding circuit for relay R2 to maintain the motor in energized condition throughout a indexing cycle.

At any time during a cycle that it is desired to stop the indexing operation, a stop switch 72 can be depressed which will deenergize the entire circuit.

As shown, the indexing circuit is interposed between power lines L1a and L2 with stop switch 72 being interposed between L1 and line L1a.

Modifications may be made within the scope of the appended claims.

What is claimed is:

1. In combination; a rotary table and an indexing device therefor, said table having follower elements thereon in circumferentially distributed relation, a drive block adjacent the table having a slot therein for receiving a follower and movable for engaging a said follower, and actuating means connected to said block and operable for moving said drive block bodily in an orbital path without rotation during which said slot in the drive block engages a follower and moves it and the table in one direction a distance equal to the spacing between said followers and then releases the follower from the slot.

2. The combination according to claim 1 in which said actuating means comprises a pair of rotary arms having said block pivotally connected to the free ends thereof, and means for driving said arms in unison.

3. The combination according to claim 1 in which said followers are pin-like and protrude axially from the underside of said table, said actuating means comprising a pair of spaced parallel arms rotatable on respective vertical axes and having said block pivotally mounted on the free ends thereof, said arms being rotatable in a plane parallel to the plane of said table, said block comprising slot means adapted closely to receive a said follower and extending across the block in a direction perpendicular to the plane of said axes, a drive motor connected to rotate said arms, means for energizing said motor to index said table, and means for halting said motor in an indexed position of the table.

4. The combination according to claim 3 which includes locating means operable for locating said table in each indexed position thereof.

5. The combination according to claim 4 in which said locating means comprise a spring biased shot bolt means and recesses in the table to be engaged thereby, means for withdrawing the shot bolt from a recess, means for energizing said motor when the shot bolt is withdrawn, means for releasing the shot bolt prior to the table reaching the next indexed position thereof, and means for deenergizing said motor after the respective follower has been released by said drive block and prior to the engagement of the next follower by said block.

* * * * *